(12) United States Patent  
Park et al.

(10) Patent No.: US 12,047,524 B2  
(45) Date of Patent: Jul. 23, 2024

(54) ANTENNA STRUCTURE AND ELECTRONIC DEVICE INCLUDING THE SAME

(71) Applicant: Samsung Electronics Co., Ltd., Gyeonggi-do (KR)

(72) Inventors: Suyang Park, Gyeonggi-do (KR); Myeongkoo Kang, Gyeonggi-do (KR); Minjae Kim, Gyeonggi-do (KR); Jaehyeok Shin, Gyeonggi-do (KR); Sungmin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 17/554,100

(22) Filed: Dec. 17, 2021

(65) Prior Publication Data

US 2022/0210256 A1  Jun. 30, 2022

Related U.S. Application Data

(63) Continuation of application No. PCT/KR2021/018957, filed on Dec. 14, 2021.

(30) Foreign Application Priority Data

Dec. 24, 2020 (KR) .................. 10-2020-0183275

(51) Int. Cl.  
   *H04M 1/02*  (2006.01)
(52) U.S. Cl.  
   CPC ....... *H04M 1/0277* (2013.01); *H04M 1/0249* (2013.01); *H04M 1/0264* (2013.01); *H04M 1/0266* (2013.01)
(58) Field of Classification Search  
   CPC .............. H04M 1/0277; H04M 1/0249; H04M 1/0264; H04M 1/0266; H04M 1/026  
   See application file for complete search history.

(56) References Cited

U.S. PATENT DOCUMENTS

| 3,916,911 A | 11/1975 | Sauder et al. |
| 2009/0278757 A1* | 11/2009 | Ahn ..................... H01Q 13/106 343/767 |
| 2018/0375195 A1* | 12/2018 | Liu ........................ H01Q 13/10 |

FOREIGN PATENT DOCUMENTS

| CN | 106898883 A | 6/2017 |
| CN | 106935951 A | 7/2017 |

(Continued)

OTHER PUBLICATIONS

International Search Report dated Mar. 17, 2022.

*Primary Examiner* — Ankur Jain  
(74) *Attorney, Agent, or Firm* — Cha & Reiter, LLC

(57) ABSTRACT

According to various embodiments of the disclosure, an electronic device may comprise a housing including a conductive portion, a wireless communication circuit electrically connected with the conductive portion, a first camera module disposed in a first area of the housing proximate to the conductive portion and including a first camera assembly and a flexible circuit board extending from the first camera assembly, a second camera module disposed in a second area of the housing, spaced apart from the first camera module, and including a second camera assembly and a camera bracket covering the second camera assembly and forming at least a partial surface of the housing, and a conductive pattern having at least a portion disposed between the first area and the second area and including a first portion coupled with the first camera module and a second portion coupled with the camera bracket. Other various embodiments are possible.

19 Claims, 11 Drawing Sheets

(56) References Cited

FOREIGN PATENT DOCUMENTS

| CN | 107230823 A | 10/2017 |
|---|---|---|
| EP | 3916911 A1 | 1/2021 |
| KR | 10-2009-0116030 A | 11/2009 |
| KR | 1020200101234 A | 8/2020 |

* cited by examiner

ANTENNA STRUCTURE AND ELECTRONIC DEVICE INCLUDING THE SAME

CROSS-REFERENCE TO RELATED APPLICATIONS

This application is a continuation of International Application No. PCT/KR2021/018957, filed on Dec. 14, 2021, which claims priority to Korean Patent Application No. 10-2020-0183275, filed on Dec. 24, 2020, in the Korean Intellectual Property Office, the disclosures of which are incorporated by reference herein in their entireties.

BACKGROUND

1. Field

Various embodiments of the disclosure relate to an antenna structure and an electronic device including the antenna structure.

2. Description of Related Art

Advancing information communication and semiconductor technologies accelerate the spread and use of various electronic devices. Electronic devices are being developed to carry out communication while carried on.

The term "electronic device" may mean a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As electronic devices are highly integrated, and high-speed, high-volume wireless communication becomes commonplace, an electronic device, such as a mobile communication terminal, is being equipped with various functions. For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way.

In an electronic device, In a structure in which a conductive portion of a housing is used as an antenna pattern, the performance of the antenna may be degraded due to interference between the antenna pattern and its surrounding metal components. In an electronic device, a portion of a camera module (e.g., a front camera and/or a rear camera) may interfere with the antenna. For example, if the front camera and the conductive portion to be used as an antenna are disposed adjacent to each other, a parasitic component that reduces frequency efficiency in a specific frequency band may be formed by the front camera.

SUMMARY

According to various embodiments of the disclosure, an electronic device may comprise a housing including a conductive portion, a wireless communication circuit electrically connected with the conductive portion, a first camera module disposed in a first area of the housing proximate to the conductive portion and including a first camera assembly and a flexible circuit board extending from the first camera assembly, a second camera module disposed in a second area of the housing, spaced apart from the first camera module, and including a second camera assembly and a camera bracket covering the second camera assembly and forming at least a partial surface of the housing, and a conductive pattern having at least a portion disposed between the first area and the second area and including a first portion coupled with the first camera module and a second portion coupled with the camera bracket.

According to various embodiments of the disclosure, an electronic device may comprise a rear plate disposed to cover a rear surface of the electronic device and having a recess structure in an edge area, a first camera module exposed through an opening of the rear plate, a camera bracket of a second camera module disposed along the recess structure and at least a portion of which is exposed to an outside, a supporting bracket including a first sidewall connected with the rear plate and a second sidewall extending from the first sidewall and connected with the camera bracket, and a supporting member disposed between the rear plate and the supporting bracket and having at least one conductive pattern formed on one surface facing the rear plate. A first conductive member forming at least a portion of the first sidewall and operating as an antenna may be disposed adjacent to the first camera module, and the conductive pattern may include a first portion coupled with the first camera module and a second portion coupled with the camera bracket.

DETAILED DESCRIPTION

Figure 1:
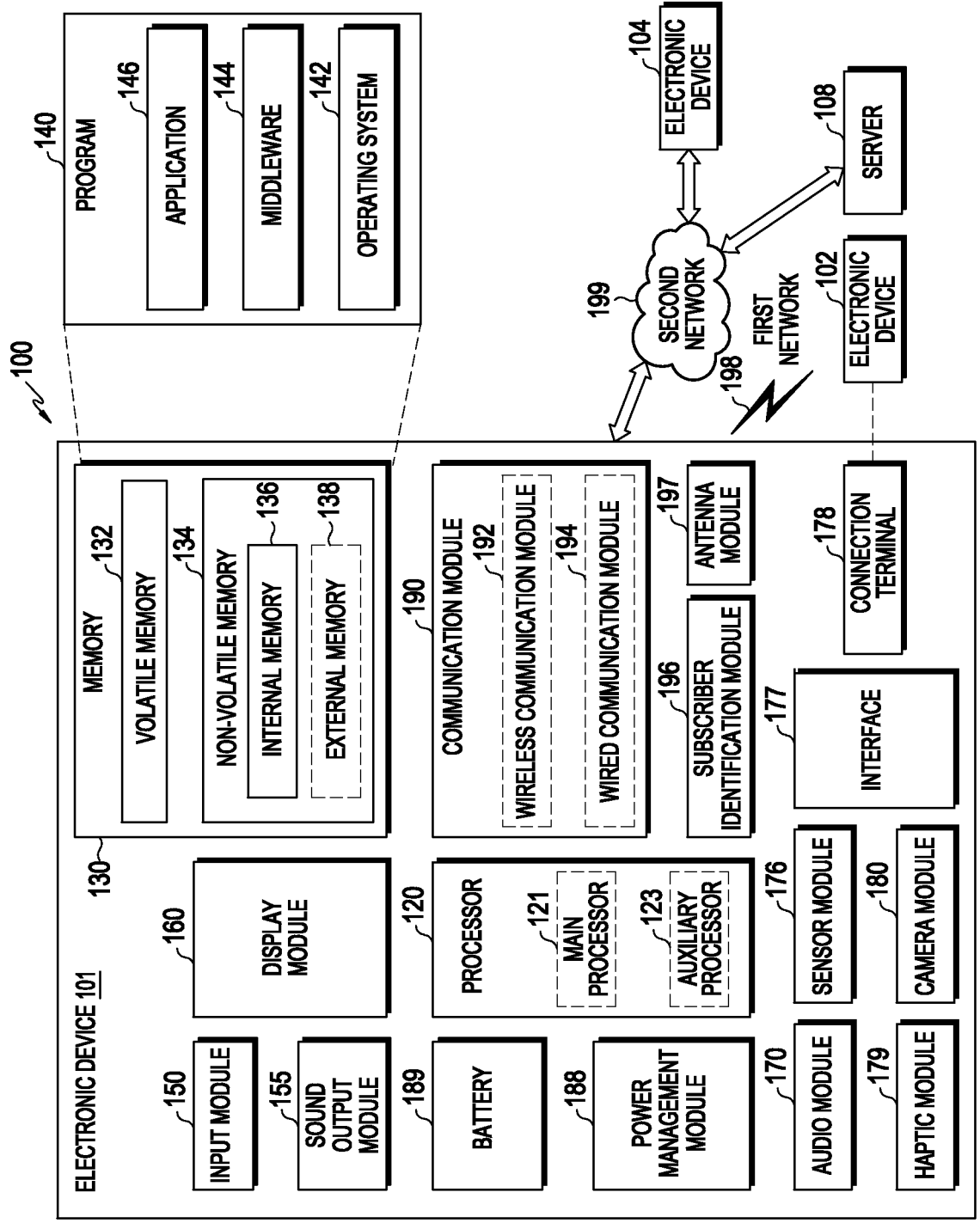
FIG. 1 is a block diagram illustrating an electronic device in a network environment according to various embodiments.

FIG. 1 is a block diagram illustrating an electronic device in a network environment according to various embodiments of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, telectronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
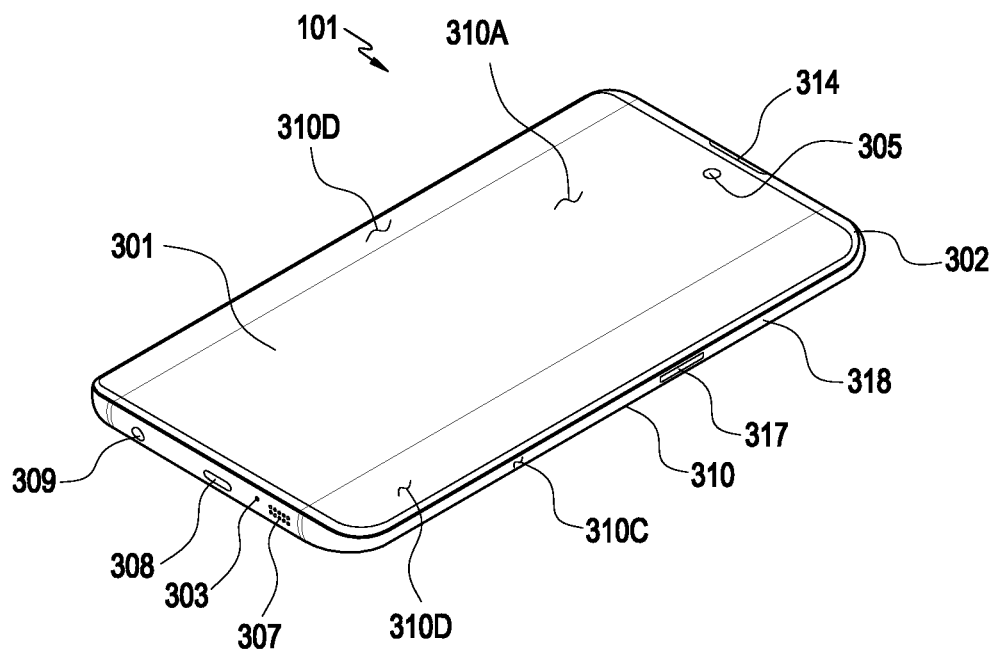
FIG. 2 is a front perspective view illustrating an electronic device according to various embodiments of the disclosure.
Figure 3:
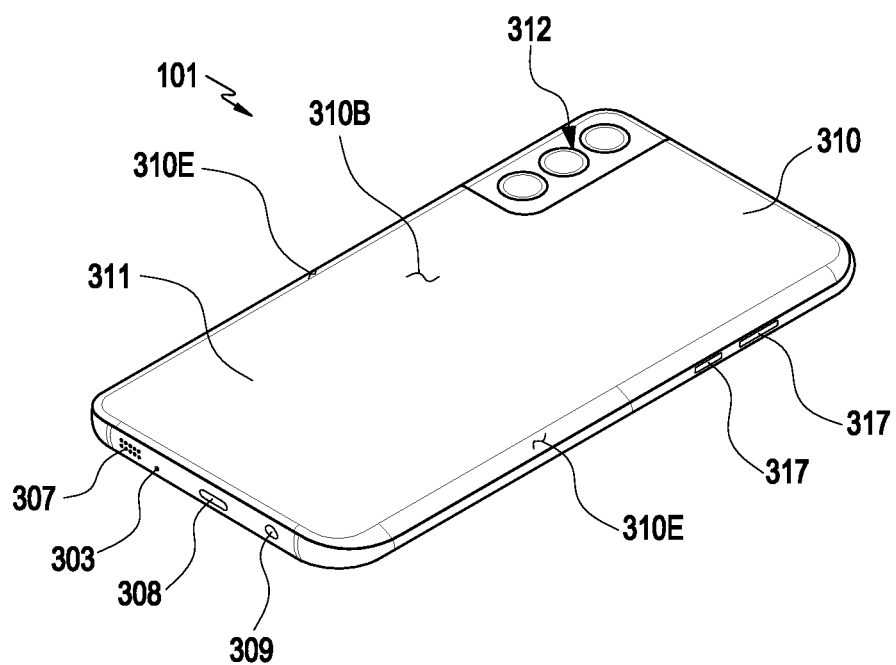
FIG. 3 is a rear perspective view illustrating an electronic device according to various embodiments of the disclosure.

FIG. 2 is a front perspective view illustrating an electronic device according to various embodiments of the disclosure; FIG. 3 is a rear perspective view illustrating an electronic device according to various embodiments of the disclosure.

Referring to FIGS. 2 and 3, according to an embodiment, an electronic device 101 may include a housing 310 with a front surface 310A, a rear surface 310B, and a side surface 310C surrounding a space between the front surface 310A and the rear surface 310B. According to another embodiment (not shown), the housing 310 may denote a structure forming part of the front surface 310A, the rear surface 310B, and the side surface 310C of FIG. 2. According to an embodiment, at least part of the front surface 310A may have a substantially transparent front plate 302 (e.g., a glass plate or polymer plate including various coat layers). The rear surface 310B may be formed by a rear plate 311. The rear plate 311 may be formed of, e.g., glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel plate 318 may be integrally formed together and include the same material (e.g., glass, metal, such as aluminum, or ceramic).

In the embodiment illustrated, the front plate 302 may include two first edge areas 310D, which seamlessly and bendingly extend from the first surface 310A to the rear plate 311, on both the long edges of the front plate 302. In the embodiment (refer to FIG. 3) illustrated, the rear plate 311 may include two second edge areas 310E, which seamlessly and bendingly extend from the rear surface 310B to the front plate, on both the long edges. According to an embodiment, the front plate 302 (or the rear plate 311) may include only one of the first edge areas 310 (or the second edge areas 310E). Alternatively, the first edge areas 310D or the second edge areas 301E may partially be excluded. According to an embodiment, at side view of the electronic device 101, the side bezel structure 318 may have a first thickness (or width) for sides that do not have the first edge areas 310D or the second edge areas 310E and a second thickness, which is smaller than the first thickness, for sides that have the first edge areas 310D or the second edge areas 310E.

According to an embodiment, the electronic device 101 may include at least one of a display 301, audio modules 303, 307, and 314 (e.g., the audio module 170 of FIG. 1), a sensor module (e.g., the sensor module of FIG. 1). 176), camera modules 305 and 312 (e.g., the camera module 180 of FIG. 1), a key input device 317 (e.g., the input module 150 of FIG. 1), and connector holes 308 and 309 (e.g., the connection terminal 178 of FIG. 1). According to an embodiment, the electronic device 101 may exclude at least one (e.g., the connector hole 309) of the components or may add other components.

According to an embodiment, the display 301 may be visually exposed through, e.g., a majority portion of the front plate 302. According to an embodiment, at least a portion of the display 301 may be exposed through the front plate 302 forming the front surface 310A and the first edge areas 310D. According to an embodiment, the edge of the display 301 may be formed to be substantially the same in shape as an adjacent outer edge of the front plate 302. According to another embodiment (not shown), the interval between the outer edge of the display 301 and the outer edge of the front plate 302 may remain substantially even to give a larger area of exposure the display 301.

According to an embodiment, the surface (or the front plate 302) of the housing 310 may include a screen display area formed as the display 301 is visually exposed. For example, the screen display area may include the front surface 310A and first edge areas 310D.

According to another embodiment (not shown), a recess or opening may be formed in a portion of the screen display area (e.g., the front surface 310A or the first edge area 310D) of the display 301, and at least one or more of the audio module 314, sensor module (not shown), light emitting device (not shown), and camera module 305 may be aligned with the recess or opening. According to another embodiment (not shown), at least one or more of the audio module 314, sensor module (not shown), camera module 305, fingerprint sensor (not shown), and light emitting device (not shown) may be included on the rear surface of the screen display area of the display 301. According to an embodiment, the display 301 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the key input device 317 may be disposed in the first edge areas 310D and/or the second edge areas 310E.

According to various embodiments, the first camera module 305 among the camera modules 305 and 312 and/or the sensor module may be disposed, in the internal space of the electronic device 101, to abut the external environment through the transmissive area of the display 301. According to an embodiment, the area facing the first camera module 305 of the display 301 may be formed as a transmissive area having a designated transmittance, as a part of the area displaying content. According to an embodiment, the transmissive area may be formed to have a transmittance in a range from about 5% to about 20%. The transmissive area may include an area overlapping an effective area (e.g., an angle-of-view area) of the first camera module 305 through which light incident on the image sensor to generate an image passes. For example, the transmissive area of the display 301 may include an area having a lower pixel density and/or wiring density than the surrounding area. For example, the transmissive area may replace a recess or opening.

According to an embodiment, the audio modules 303, 307, and 314 may include, e.g., a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. In some embodiments, the speaker holes 307 and 314 and the microphone hole 303 may be implemented as a single hole, or a speaker may be included without the speaker holes 307 and 314 (e.g., a piezo speaker). The audio modules 303, 307, and 314 are not limited to the above-described structure. Depending on the structure of the electronic device 101, various design changes may be made—e.g., only some of the audio modules may be mounted, or a new audio module may be added.

According to an embodiment, the sensor modules (not shown) may generate an electrical signal or data value corresponding to an internal operating state or external environmental state of the electronic device 101. The sensor modules (not shown) may include a first sensor module (e.g., a proximity sensor) and/or a second sensor module (e.g., a fingerprint sensor) disposed on the front surface 310A of the housing 310 and/or a third sensor module (e.g., an HRM sensor) and/or a fourth sensor module (e.g., a fingerprint sensor) disposed on the rear surface 310B of the housing 310. In an embodiment (not shown), the fingerprint sensor may be disposed on the rear surface 310B as well as on the front surface 310A (e.g., the display 301) of the housing 310. The electronic device 101 may include a sensor module not shown, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor. The sensor modules are not limited to the above-described structure. Depending on the structure of the electronic device 101, various design changes may be made—e.g., only some of the sensor modules may be mounted, or a new sensor module may be added.

According to an embodiment, the camera modules 305 and 312 may include a first camera module 305 disposed on the front surface 310A of the electronic device 101, and a rear camera device 312 and/or a flash (not shown) disposed on the rear surface 310B. The camera modules 305 and 312 may include one or more lenses, an image sensor, and/or an image signal processor. The flash (not shown) may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 101. The camera modules 305 and 312 are not limited to the above-described structure. Depending on the structure of the electronic device 101, various design changes may be made—e.g., only some of the camera modules may be mounted, or a new camera module may be added.

According to an embodiment, the electronic device 101 may include a plurality of camera modules (e.g., a dual camera or triple camera) having different attributes (e.g., angle of view) or functions. For example, a plurality of camera modules 305 and 312 including lenses having different angles of view may be configured, and the electronic device 101 may control to change the angle of view of the camera modules 305 and 312 performed by the electronic device 101 based on the user's selection. At least one of the camera modules 305 and 312 may form, for example, a wide-angle camera and at least another of the plurality of camera modules may form a telephoto camera. Similarly, at least one of the camera modules 305 and 312 may form, for example, a front camera and at least another of the plurality of camera modules may form a rear camera. Further, the camera modules 305 and 312 may include at least one of a wide-angle camera, a telephoto camera, and an infrared (IR) camera (e.g., a time of flight (TOF) camera, a structured light camera). According to an embodiment, the IR camera may be operated as at least a portion of the sensor module. For example, the TOF camera may be operated as at least a portion of a sensor module (not shown) for detecting the distance to the subject.

According to an embodiment, the key input device 317 may be disposed on the side surface 310C of the housing 310. According to an embodiment, the electronic device 101 may exclude all or some of the above-mentioned key input devices 317 and the excluded key input devices 317 may be implemented in other forms, e.g., as soft keys, on the display 301. According to an embodiment, the key input device may include the sensor module 316 disposed on the second surface 310B of the housing 310.

According to an embodiment, the light emitting device (not shown) may be disposed on, e.g., the front surface 310A of the housing 310. The light emitting device (not shown) may provide, e.g., information about the state of the electronic device 101 in the form of light. According to another embodiment, the light emitting device (not shown) may provide a light source that interacts with, e.g., the front camera module 305. The light emitting device (not shown) may include, e.g., a light emitting device (LED), an infrared (IR) LED, and/or a xenon lamp.

According to an embodiment, the connector holes 308 and 309 may include, e.g., a first connector hole 308 for receiving a connector (e.g., a universal serial bus (USB) connector) for transmitting or receiving power and/or data to/from an external electronic device and/or a second connector hole (e.g., an earphone jack) 309 for receiving a connector for transmitting or receiving audio signals to/from the external electronic device.

According to an embodiment, the first camera module 305 of the camera modules 305 and 312 and/or some of the sensor modules (not shown) may be disposed to be exposed to the outside through at least a portion of the display 301. For example, the camera module 305 may include a punch hole camera disposed inside a hole or recess formed in the rear surface of the display 301. According to an embodiment, the second camera module 312 may be disposed inside the housing 310 so that the lens is exposed to the second surface 310B of the electronic device 101. For example, the second camera module 312 may be disposed on a printed circuit board (e.g., the printed circuit board 340 of FIG. 4).

According to an embodiment, the first camera module 305 and/or the sensor module may be disposed to contact the external environment through a transparent area from the internal space of the electronic device 101 to the front plate 302 of the display 301. Further, some sensor module 304 may be disposed to perform its functions without being visually exposed through the front plate 302 in the internal space of the electronic device.

Figure 4:
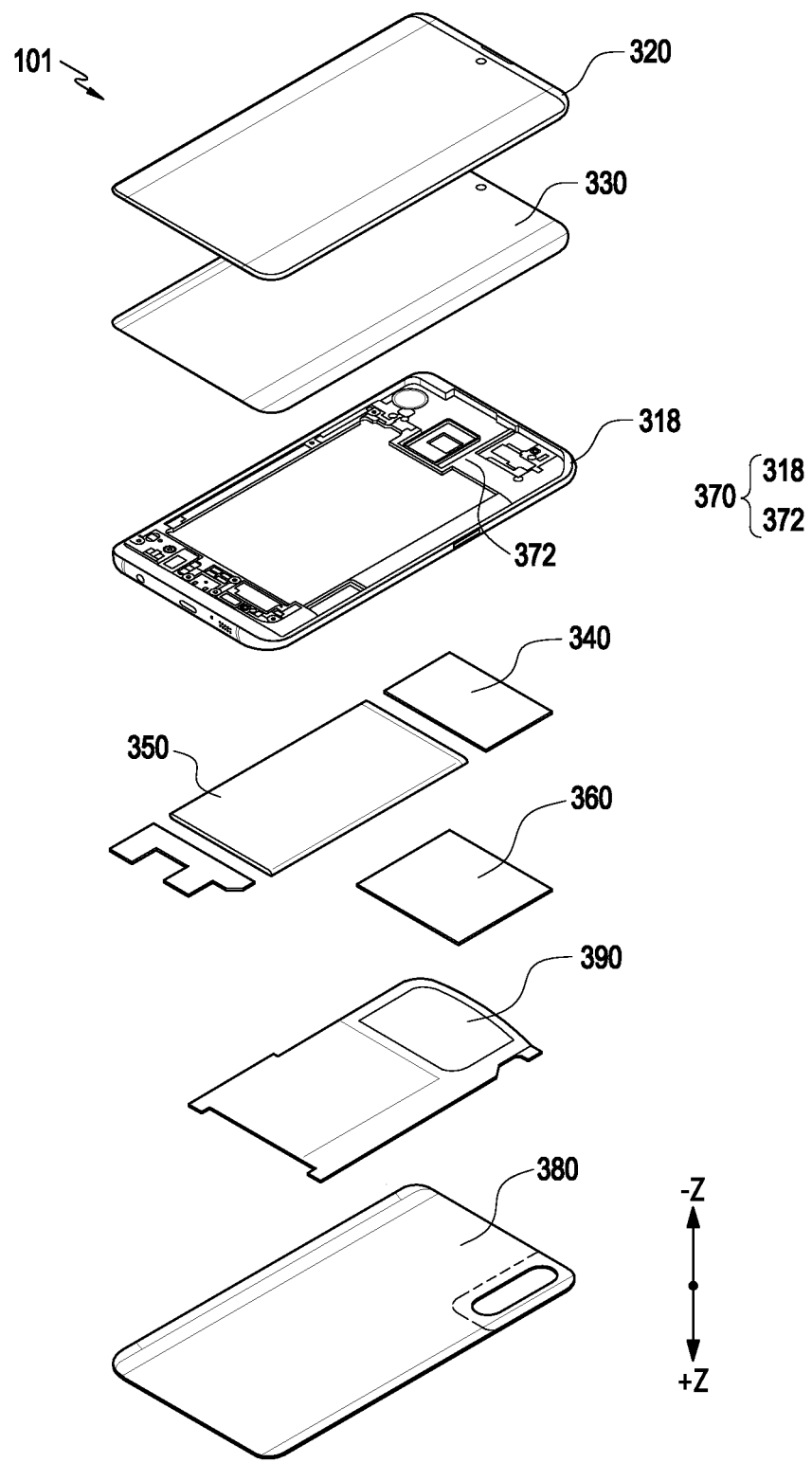
FIG. 4 is an exploded perspective view illustrating an electronic device according to various embodiments of the disclosure.

FIG. 4 is an exploded perspective view illustrating an electronic device according to various embodiments of the disclosure.

Referring to FIG. 4, according to various embodiments, an electronic device 101 (e.g., the electronic device 101 of FIGS. 1 to 3) may include a supporting bracket 370, a front plate 320 (e.g., the front plate 302 of FIG. 2), a display 330 (e.g., the display 301 of FIG. 2), a printed circuit board 340 (e.g., a PCB, flexible PCB (FPCB), or rigid flexible PCB (RFPCB)), a battery 350 (e.g., the battery 189 in FIG. 1), a second supporting member 360 (e.g., a rear case), an antenna 390 (e.g., the antenna module 197 of FIG. 1), and a rear plate 380 (e.g., the rear plate 311 of FIG. 2). The supporting bracket 370 of the electronic device 101 according to an embodiment may include a side bezel structure 318 (e.g., the side bezel structure 318 of FIG. 2) and a first supporting member 372.

According to an embodiment, the electronic device 101 may exclude at least one (e.g., the first supporting member 372 or second supporting member 360) of the components or may add other components. At least one of the components of the electronic device 101 may be the same or similar to at least one of the components of the electronic device 101 of FIG. 2 or 3 and no duplicate description is made below.

According to various embodiments, the first supporting member 372 may be disposed inside the electronic device 101 to be connected with the side bezel structure 318 or integrated with the side bezel structure 318. The first supporting member 372 may be formed of, e.g., a metal and/or non-metal material (e.g., polymer). The display 330 may be joined onto one surface of the first supporting member 372, and the printed circuit board 340 may be joined onto the opposite surface of the first supporting member 311.

According to various embodiments, a processor, a memory, and/or an interface may be mounted on the printed circuit board 340. The processor may include one or more of, e.g., a central processing unit, an application processor, a graphic processing device, an image signal processing, a sensor hub processor, or a communication processor. According to various embodiments, the printed circuit board 340 may include a flexible printed circuit board type radio frequency cable (FRC). For example, the printed circuit board 340 may be disposed on at least a portion of the first supporting member 372 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the battery 350 may be a device for supplying power to at least one component of the electronic device 101. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

According to various embodiments, the second supporting member 360 (e.g., a rear case) may be disposed between the printed circuit board 340 and the antenna 390. For example, the second supporting member 360 may include one surface to which at least one of the printed circuit board 340 and the battery 350 is coupled, and another surface to which the antenna 390 is coupled.

According to an embodiment, the antenna 390 may be disposed between the rear plate 380 and the battery 350. The antenna 390 may include, e.g., a near-field communication (NFC) antenna, a wireless charging antenna, and/or a magnetic secure transmission (MST) antenna. The antenna 390 may perform short-range communication with, e.g., an external device or may wirelessly transmit or receive power necessary for charging. According to an embodiment, an antenna structure may be formed by a portion or combination of the side bezel structure 318 and/or the first supporting member 372.

According to various embodiments, the rear plate 380 may form at least a portion of the rear surface (e.g., the second surface 310B of FIG. 3) of the electronic device 101.

Figure 5:
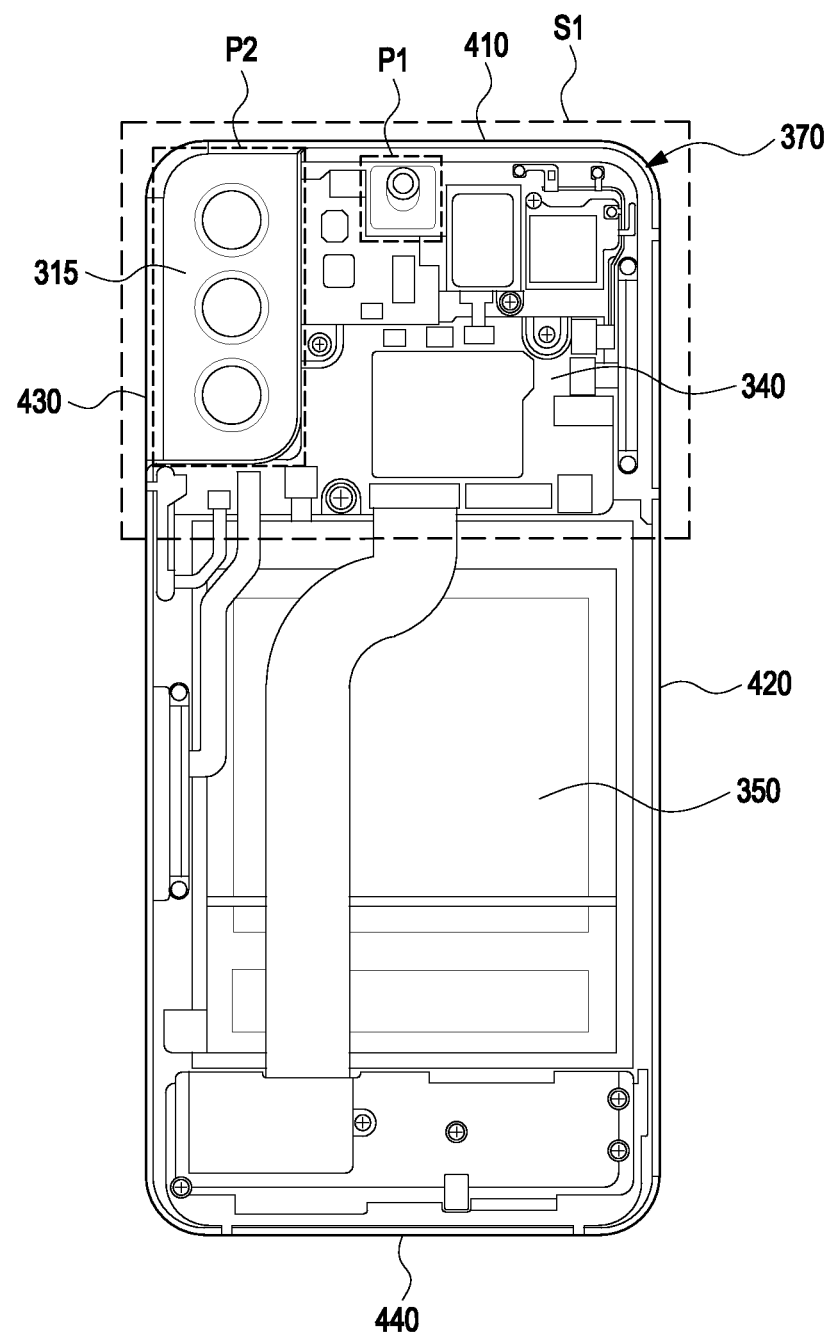
FIG. 5 is an internal see-through view illustrating an electronic device with a rear plate removed, according to another one of various embodiments of the disclosure.
Figure 6:
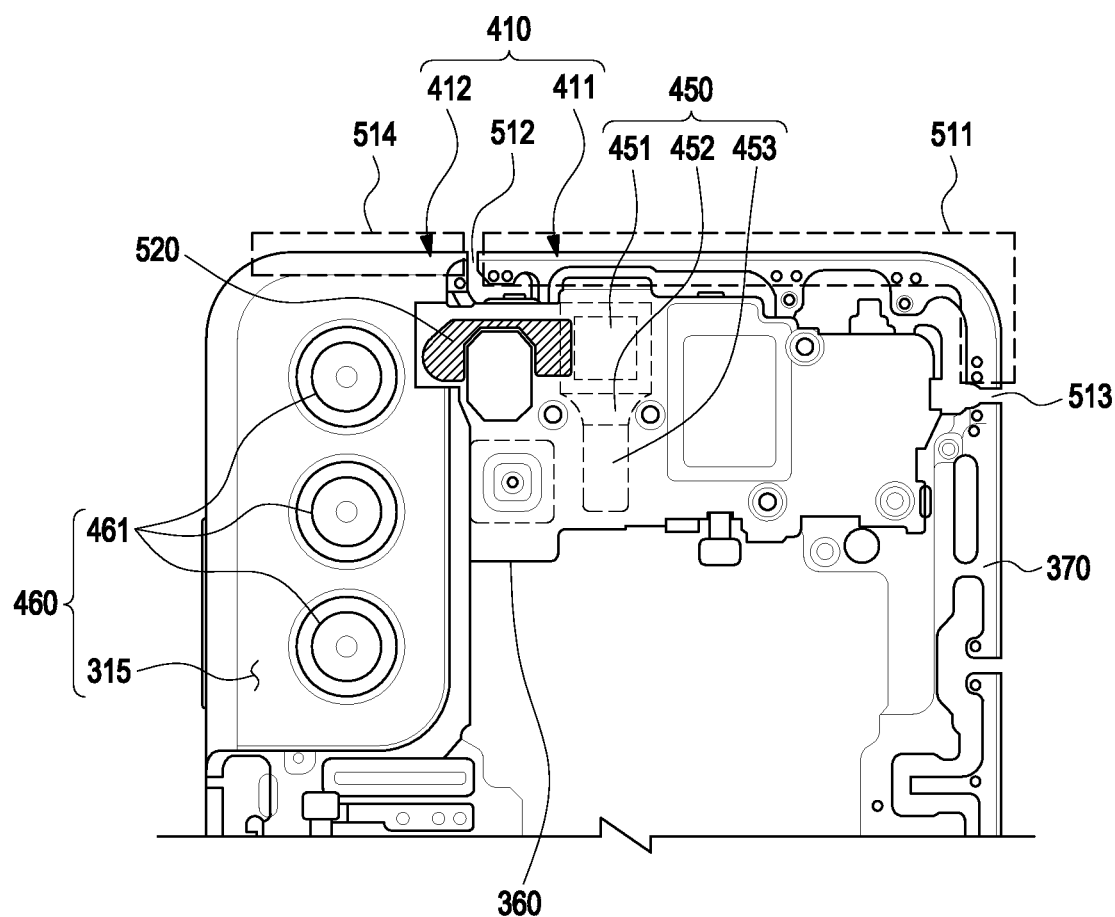
FIG. 6 is a view illustrating a conductive pattern and a surrounding structure as an area S1 of FIG. 5 is enlarged, and a supporting member is projected.
Figure 7:
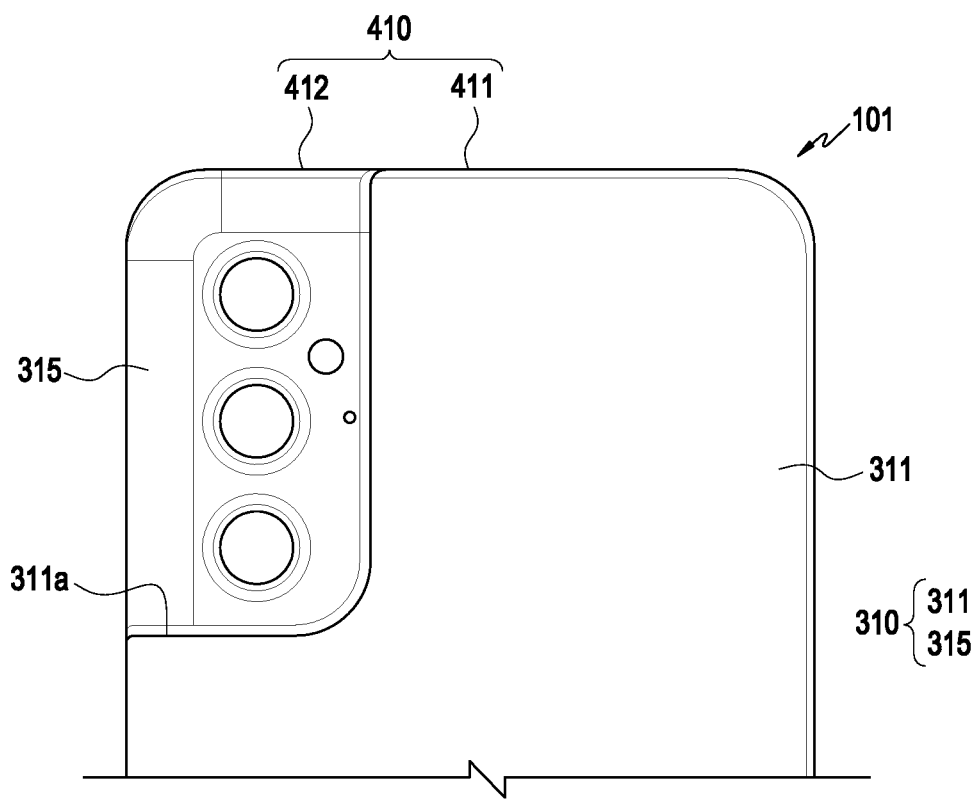
FIG. 7 is a view illustrating a structure in which a partial area of an electronic device is covered by a rear plate and a camera plate according to one of various embodiments of the disclosure.

FIG. 5 is an internal see-through view illustrating an electronic device with a rear plate removed. FIG. 6 is a view illustrating a conductive pattern and a surrounding structure as an area S1 of FIG. 5 is enlarged, and a supporting member is projected. FIG. 7 is a view illustrating a structure in which a partial area of an electronic device is covered by a rear plate and a camera plate according to one of various embodiments of the disclosure.

According to various embodiments, the electronic device (e.g., the electronic device 101 of FIGS. 1 to 4) may include a housing 310, a first camera module 450 (e.g., the first camera module 305 of FIG. 2), a second camera module 460 (e.g., the second camera module 312 of FIG. 2), a printed circuit board 340, and/or a battery 350. According to an embodiment, the housing 310 may include a supporting bracket 370 formed along a side surface of the electronic device 101, a rear plate 311 covering the rear surface of the electronic device 101, and a camera bracket 315. According to an embodiment, the housing 310 may further include a second supporting member 360, at least a portion of which is disposed between the rear plate 311 and the supporting bracket 370.

The configuration of the housing 310, the first camera module 450, the second camera module 460, the printed circuit board 340, and the battery 350 of FIGS. 5 to 7 may be identical in whole or part to the configuration of the housing 310 of FIGS. 2 and 3, the camera modules 305 and 312, the printed circuit board 340 of FIG. 4, and the battery 350.

According to various embodiments, the housing 310 of the electronic device 101 may include a first surface (e.g., a rear surface) at least a portion of which faces in a first direction (e.g., the +Z-axis direction of FIG. 4), a second surface (e.g., a front surface) at least a portion of which faces in a second direction (e.g., the −Z-axis direction of FIG. 4) opposite to the first direction, and a side wall formed to surround an inner space formed between the first surface and the second surface. According to an embodiment, the first surface of the housing 310 may be formed by the rear plate 311 and the camera bracket 315 of the second camera module 460. For example, the rear plate 311 may include a recess structure 311a formed in an edge area, and the camera bracket 315 having a shape corresponding to the recess structure 311a is disposed along the recess structure 311a and exposed to the outside. The recess structure 311a may include various shapes, such as an opening, a hole, or a groove, having a different thickness as compared to the adjacent area. As another example, the recess structure 311a formed in the rear plate 311 may be manufactured in the shape of 'ᅳ' or 'ᄂ' when viewed from above the rear plate 311, and one side of the corner of the rear plate 311 may be cut out. According to an embodiment, the camera bracket 315 may be formed in a shape corresponding to the cut shape and may be disposed in contact with or adjacent to the rear plate 311. According to an embodiment, the camera bracket 315 may be manufactured integrally with the supporting bracket 370. According to another embodiment, at least a portion of the recess structure 311a may be manufactured integrally with the rear plate 311.

According to various embodiments, a side wall of the housing 310 may be formed by a side bezel structure 318 of the supporting bracket 370. The edge area of the supporting bracket 370 may have a closed loop shape and may have a partial area coupled with the rear plate 311 and another partial area coupled with the camera bracket 315. The edge area of the supporting bracket 370 has a substantially rectangular closed loop shape and may include a first sidewall 410, a second sidewall 420, a third sidewall 430, and a fourth sidewall 440 facing in different directions. For example, referring to FIG. 5, the first sidewall 410 may include a side surface facing an upper end (e.g., the +Y-axis direction) of the electronic device 101 and may be adjacent to or coupled with an upper end (e.g., the +Y-axis direction) of the rear plate 311 and an upper end (e.g., +Y-axis direction) of the camera bracket 315. The second sidewall 420 may include a side surface facing a right end (e.g., the +X-axis direction) of the electronic device 101 and may be adjacent to or coupled with a right end (e.g., +X-axis direction) of the rear plate 311. The third sidewall 430 may include a side surface facing a left end (e.g., the −X-axis direction) of the electronic device 101 and may be adjacent to or coupled with a left end (e.g., the −X-axis direction) of the rear plate 311 and a left end (e.g., the −X-axis direction) of the camera bracket 315. The fourth sidewall 440 may include a side surface facing a lower end (e.g., the −Y-axis direction) of the electronic device 101 and may be adjacent to or coupled with a lower end (e.g., the −Y-axis direction) of the rear plate 311. As another example, the edge area of the supporting bracket 370 connected to each other among the first sidewall 410, the second sidewall 420, the third sidewall 430, and the fourth sidewall 440 may include seamlessly connected bends.

According to various embodiments, the electronic device 101 may include an antenna structure. The antenna structure may include a plurality of antennas. For example, the antenna may include an antenna pattern, a feeding unit, or a ground unit. In an embodiment, the antenna structure may be formed in an upper area of the housing 310 disposed adjacent to the camera bracket 315. According to an embodiment, the antenna pattern may include at least a portion of the housing 310 (e.g., the supporting bracket 370) formed of a conductive material. For example, the housing 310 may include conductive portions 511 and 514 formed at least partially of a metal material and a non-conductive portion (hereinafter, a sidewall gap 512 or 513) disposed adjacent to the conductive portion. At least a portion of the conductive portions 511 and 514 may act as an antenna pattern.

According to various embodiments, the first sidewall 410 of the supporting bracket 370 may include a 1-1th sidewall 411 and a 1-2th sidewall 412 spaced apart from the 1-1th sidewall 411 and adjacent to the camera bracket 315. At least a portion of the 1-1th sidewall 411 and/or the 1-2th sidewall 412 may operate as a radiator of the antenna. For example, at least a portion of the 1-1th sidewall 411 and/or the 1-2th sidewall 412 may protect components disposed inside the electronic device 101 and provide a function of operating as an antenna. The conductive portions 511 and 514 of the 1-1th sidewall 411 and/or the 1-2th sidewall 412, which operate as antennas, may be electrically connected with a wireless communication circuit (e.g., the wireless communication module 192 of FIG. 1) and configured to transmit and/or receive radio frequency (RF) signals. For example, the 1-1th sidewall 411 may include a first conductive portion 511, and the 1-2th sidewall 412 may include a second conductive portion 514. A first sidewall gap 512 may be positioned between the first conductive portion 511 and the second conductive portion 514.

According to various embodiments, the first conductive portion 511 included in the 1-1th sidewall 411 and the second conductive portion 514 included in the 1-2th sidewall 412 may transmit and/or receive radio frequency (RF) signals corresponding to the lengths of the first conductive portion 511 and the second conductive portion 514. For example, the first conductive portion 511 may be a metal portion having a length larger than the second conductive length 514. The first conductive portion 511 may serve as a low band DRX and mid band/high band MIMO antenna. The second conductive portion 514 may serve as a mid band/high band DRX antenna.

According to various embodiments, a first sidewall gap 512 may be formed on the 1-1th sidewall 411. For example, as the first sidewall gap 512 is formed to segment the first conductive portion 511 or the second conductive portion 514 of the 1-1th sidewall 411, a plurality of antennas may be formed. For example, the sidewall gaps 512 or 513 may be formed by performing such a process as etching, cutting, or stamping, on the surface of the supporting bracket 370 so that the conductive portions included in the sidewalls of the housing 310 may be separated. The conductive portions may be insulated from each other by the sidewall gaps 512 or 513. According to an embodiment, the sidewall gaps 512 or 513 may include a first sidewall gap 512 and a second sidewall gap 513 positioned at two opposite ends of the first conductive portion 511. The first sidewall gap 512 may be positioned on the 1-1th sidewall 411 and may segment the first conductive portion 511 and the second conductive portion 514. According to an embodiment, the second sidewall gap 513 may be positioned on the second sidewall 420 and may be disposed farther from the 1-2th sidewall 412 than the first sidewall gap 512. Since the length of the first conductive portion 511 is determined according to the position of the second sidewall gap 513, the second sidewall gap 513 may be formed according to the operating frequency of the antenna including the first conductive portion 511.

According to various embodiments, the first sidewall gap 512 and/or the second sidewall gap 513 may be a non-conductive portion and may provide a dielectric constant different from that of the first conductive portion 511. For example, the first sidewall gap 512 and/or the second sidewall gap 513 may be filled with an insulating material for insulation, and it may include, but is not limited to, an elastomeric material, ceramic, mica, glass, plastic, metal oxide, air, and/or any insulative material including a material that is superior in insulation to metal.

According to various embodiments, the first camera module 450 (e.g., the front camera module) may be disposed in an inner area (e.g., a first area P1) of the supporting bracket 370 adjacent to the 1-1th sidewall 411. For example, the first camera module 450 may include a first camera assembly 451, a flexible circuit board 452 extending from the first camera assembly 451, and/or a ground unit 453 electrically connecting the flexible circuit board 452 and the main circuit board (e.g., the printed circuit board of FIG. 4). According to an embodiment, the first camera assembly 451 may include a lens assembly facing in the −Z-axis direction (e.g., the −Z-axis direction of FIG. 4), and at least a portion of the lens assembly may be positioned to pass through the opening of the supporting bracket 370. The flexible circuit board 452 may extend in a direction (e.g., the −Y-axis direction) opposite to the 1-1th sidewall 411 and may be electrically connected with the ground unit 453.

According to various embodiments, the second camera module 460 (e.g., the rear camera module) may be disposed in an inner area (e.g., a second area P2) of the supporting bracket 370 adjacent to the 1-2th sidewall 412. For example, the second camera module 460 may be spaced apart from the first camera module 450 and may include the camera bracket 315 that covers the second camera assembly 461 and forms at least a portion of the housing 310. In an embodiment, if a plurality of second camera assemblies 461 are formed, the camera bracket 315 may overall cover the plurality of camera assemblies and may include a plurality of openings formed to allow at least a portion of each lens assembly to pass therethrough.

According to various embodiments, a second supporting member 360 (e.g., the second supporting member 360 of FIG. 4) may be disposed between the supporting bracket 370 and the rear plate 311 (and the camera bracket 315). According to an embodiment, a conductive pattern 520 may be formed in one area of the supporting member 360. The conductive pattern 520 may be electrically connected with surrounding metal components. For example, at least a portion of the conductive pattern 520 may be positioned between the first area P1 and the second area P2 and may be electrically connected with the camera bracket 315 of the first camera module 450 and the second camera module 460.

The conductive pattern 520 is described below. In the following embodiment, although it is disclosed below that the surrounding metal components electrically connected or coupled with the conductive pattern 520 are the camera bracket 315 of the first camera module 450 and the second camera module 460, embodiments of the disclosure are not limited thereto. A device electrically connected or coupled with the conductive pattern 520 may be any one of various metal components adjacent to the conductive pattern 520.

Figure 8:
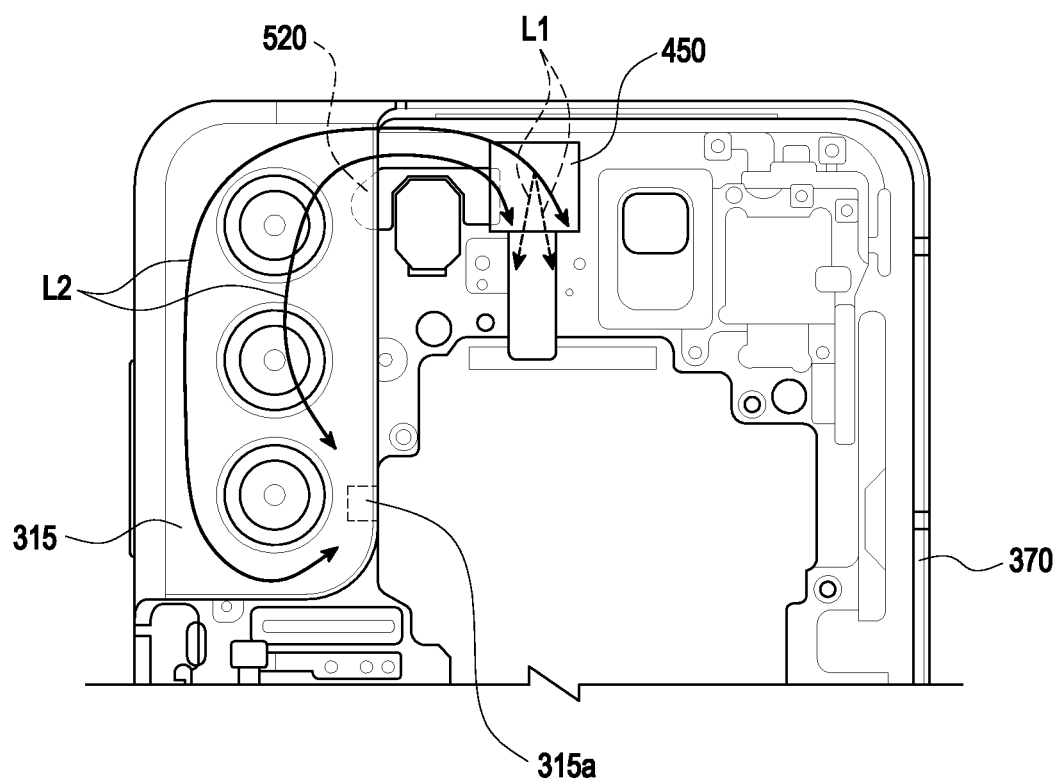
FIG. 8 is a view illustrating a conductive pattern formed on a supporting member of an electronic device according to one of various embodiments of the disclosure.
Figure 9:
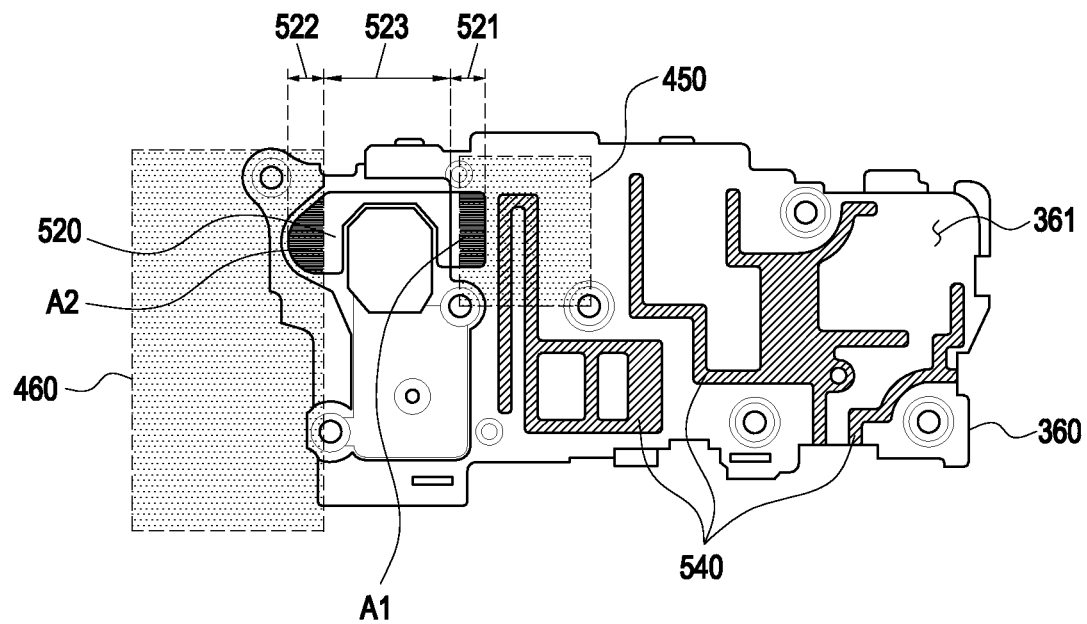
FIG. 9 is a cross-sectional view illustrating a connection relationship between a conductive pattern formed on a supporting member of an electronic device and a surrounding device according to one of various embodiments of the disclosure.
Figure 10:
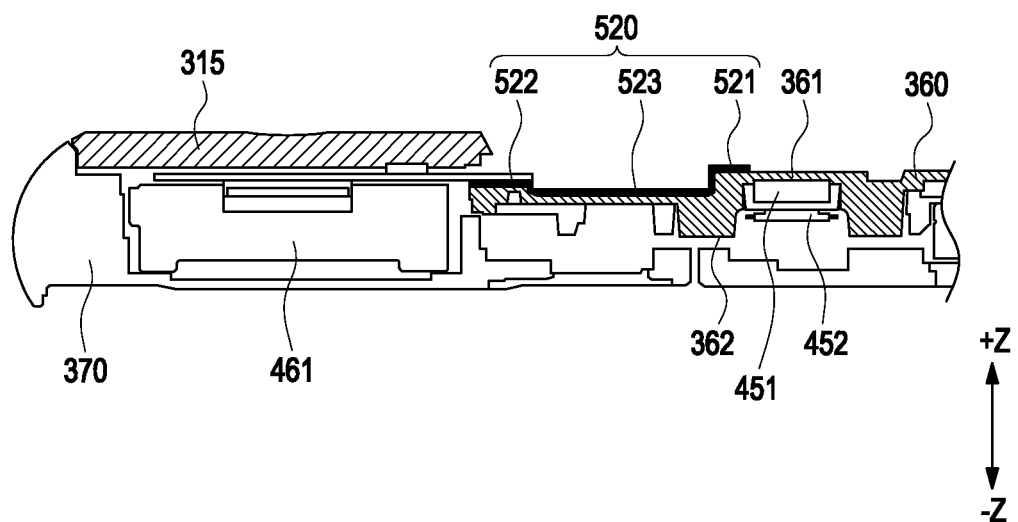
FIG. 10 is a view schematically illustrating a flow of an antenna signal path according to the conductive pattern of FIGS. 8 and 9, according to one of various embodiments of the disclosure.

FIG. 8 is a view illustrating a conductive pattern formed on a supporting member of an electronic device according to one of various embodiments of the disclosure. FIG. 9 is a cross-sectional view illustrating a connection relationship between a conductive pattern formed on a supporting member of an electronic device and a surrounding device according to one of various embodiments of the disclosure. FIG. 10 is a view schematically illustrating a flow of an antenna signal path according to the conductive pattern of FIGS. 8 and 9, according to one of various embodiments of the disclosure.

According to various embodiments, an electronic device (e.g., the electronic device 101 of FIGS. 1 to 4) may include a housing (e.g., the housing 310 of FIGS. 2 and 3), a first camera module 450, and a second camera module 460. According to an embodiment, the housing 310 may include a supporting bracket 370 formed along a side surface of the electronic device 101, a rear plate 311 covering the rear surface of the electronic device 101, and a camera bracket 315. According to an embodiment, the housing 310 may further include a second supporting member 360, at least a portion of which is disposed between the rear plate 311 and the supporting bracket 370.

The configuration of the housing 310, the first camera module 450, the second camera module 460, and the conductive pattern 520 of FIGS. 8 to 10 may be identical in whole or part to the configuration of the housing 310, the first camera module 450, the second camera module 460, and the conductive pattern 520 of FIGS. 5 to 7. The configuration of the second supporting member 360 of FIGS. 8 to 10 may be identical in whole or part to the configuration of the second supporting member 360 (e.g., a rear case) of FIG. 4.

According to various embodiments, the first camera module 450 may include a first camera assembly 451 and may be disposed in a first area of the housing 310. The second camera module may include a second camera assembly 461 and a camera bracket 315 that covers the second camera assembly 461 and is exposed to the outside. The second camera module 460 may be spaced apart from the first camera module 450 and may be disposed in a second area of the housing 310.

According to various embodiments, a conductive pattern 520 may be formed in one area of the second supporting member 360. The second supporting member 360 may include a first surface 361 facing in the +Z-axis direction and a second surface 362 facing in the −Z-axis direction. The first surface 361 may be disposed to face the rear plate 311 (and/or the camera bracket 315), and the second surface 362 may be disposed to face a partial area of the supporting bracket 370. The first surface 361 of the second supporting member 360 may include an antenna pattern 540 used as an antenna radiator and a conductive pattern 520 for electrically connecting devices in the electronic device.

According to an embodiment, the antenna pattern 540 and/or the conductive pattern 520 may be a laser direct structuring (LDS) pattern and may be formed of a conductive material including a metal material, such as copper or nickel. For example, the LDS pattern may be formed through a plating and coating process after selectively processing a pattern on an injection-molded material (e.g., a material including a thermoplastic resin) using a laser. Through laser processing, it is possible to facilitate the plating of a metal material on the rough resin surface in a micro scale.

According to an embodiment, the conductive pattern 520 may be disposed to be coupled with its surrounding metal structure. According to an embodiment, when viewed toward the first surface 361 of the second supporting member 360, at least a portion of the conductive pattern 520 may be disposed to overlap the first camera module 450 and the camera bracket 315, and another portion may be disposed between the first camera module 450 and the camera bracket 315. According to an embodiment, the conductive pattern 520 may include a first portion 521 coupled with the first camera module 450 and a second portion 522 coupled with the camera bracket 315. According to another embodiment, the conductive pattern 520 may further include a third portion 523 disposed between the first portion 521 and the second portion 522 to connect the first portion 521 and the second portion 522.

In a comparative example, if the front camera (e.g., corresponding to the first camera module 450) and the conductive portion to be used as an antenna are disposed adjacent to each other, a parasitic component that reduces frequency efficiency in a specific frequency band may be formed by the front camera, reducing the antenna efficiency required in the conductive portion.

According to an embodiment, the first portion 521 of the conductive pattern 520 may be disposed to face a first edge area A1 (e.g., an edge area facing the second camera module 460) of the first camera module 450, and the second portion 522 of the conductive pattern 520 may be disposed to face a second edge area A2 (e.g., an edge area facing the first camera module 450) of the camera bracket 315.

According to an embodiment, the first portion 521 of the conductive pattern 520 and the first edge area A1 of the first camera module 450 may be spaced apart from each other and form a coupling, and the second portion 522 of the conductive pattern 520 and the second edge area A2 of the camera bracket 315 may be spaced apart from each other and form a coupling. For example, one surface of the first portion 521 of the conductive pattern 520, facing in the +Z axis, and the first edge area A1 of the first camera module 450 may form a coupling while facing each other, and another surface of the second portion 522 of the conductive pattern 520, facing in the −Z axis, and the second edge area A2 of the camera bracket 315 may form a coupling while facing each other. By coupling the first portion 521 of the conductive pattern 520 and the first edge area A1 of the first camera module 450, it is possible to extend the length of the antenna formed by the first camera assembly 451 and the flexible circuit board 452. By coupling the second portion 522 of the conductive pattern 520 and the second edge area A2 of the camera bracket 315, a ground extending from the camera bracket 315 may be formed, and thus, it is possible to reduce the effect of parasitic components and enhance antenna specific frequency efficiency.

According to an embodiment, as the first camera module 450 and the camera bracket 315 are coupled by the conductive pattern 520, one extended ground may be formed. If the area of the ground coupled with the antenna radiator (e.g., the first conductive portion 511 of FIG. 6) is changed so that the electrical length is increased, the frequency of the generated parasitic resonance may be changed so that interference with the antenna may be reduced.

For example, referring to FIG. 10, if the conductive pattern 520 is excluded, a parasitic component may be generated based on the electrical length, e.g., L1. In contrast, if the conductive pattern 520 is coupled with the first camera module 450 and the camera bracket 315, the area of the camera bracket 315 formed of a metal material is used as a ground so that the electrical length is increased to, e.g., L2, and the frequency band of the parasitic component may be changed. For example, the parasitic component based on the length of L1 may interfere with the antenna included in the electronic device 101 and may deteriorate the performance of the antenna. However, if L1 is changed to L2, the frequency band of the parasitic component may be changed so that interference with the antenna included in the electronic device 101 may be reduced and the performance of the antenna may be maintained.

According to various embodiments, a ground member 315a may be formed in one area of the camera bracket 315, and the ground member 315a may be electrically connected with the main circuit board (e.g., the printed circuit board 340 of FIG. 4). The ground member 315a may be formed in one area of the camera bracket 315 disposed adjacent to the main circuit board and may be disposed towards the supporting bracket 370. For example, the ground member 315a may be directly connected with a portion of the main circuit board. As another example, the ground member 315a may be formed of a conductive member, such as a wire or a clip (e.g., c-clip), and may be electrically connected with the main circuit board.

Figure 11:
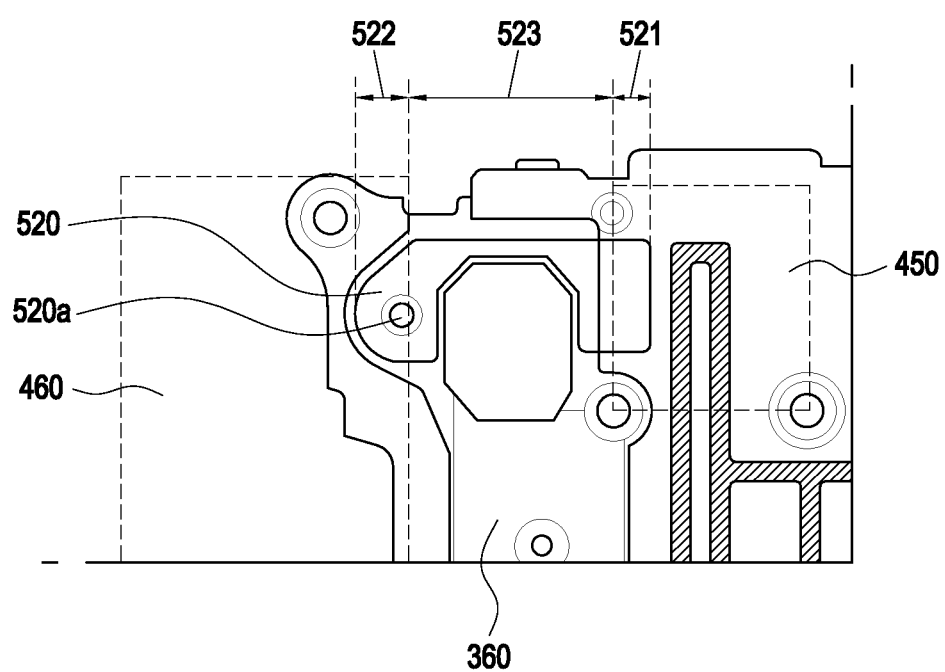
FIG. 11 is a view illustrating a conductive pattern formed on a supporting member of an electronic device according to another one of various embodiments of the disclosure.

FIG. 11 is a view illustrating a conductive pattern formed on a supporting member of an electronic device according to another one of various embodiments of the disclosure.

According to various embodiments, an electronic device (e.g., the electronic device 101 of FIGS. 1 to 4) may include a housing (e.g., the housing 310 of FIGS. 2 and 3), a first camera module 450, and a second camera module 460. According to an embodiment, the housing 310 may include a supporting bracket (e.g., the supporting bracket 370 of FIGS. 8 to 10) formed along a side surface of the electronic device 101, a rear plate (e.g., the rear plate 311 of FIGS. 8 to 10) covering a rear surface of the electronic device 101, and a camera bracket (e.g., the camera bracket 315 of FIGS. 8 to 10). According to an embodiment, the housing 310 may further include a second supporting member 360, at least a portion of which is disposed between the rear plate 311 and the supporting bracket 370.

The configuration of the housing 310, the first camera module 450, the second camera module 460, and the conductive pattern 520 of FIG. 11 may be identical in whole or part to the configuration of the housing 310, the first camera module 450, the second camera module 460, and the conductive pattern 520 of FIGS. 8 to 10. The configuration of the second supporting member 360 of FIGS. 8 to 10 may be identical in whole or part to the configuration of the second supporting member 360 (e.g., a rear case) of FIG. 4.

The configuration of the housing 310, the first camera module 450, the second camera module 460, the conductive pattern 520, and the supporting member 360 of FIG. 11 may be identical in whole or part to the configuration of the housing 310, the first camera module 450, the second camera module 460, the conductive pattern 520, and the supporting member 360 of FIGS. 8 to 10. The following description focuses primarily on a structure different from the conductive pattern 520 of FIGS. 8 to 10.

According to various embodiments, a conductive pattern 520 may be formed in one area of the second supporting member 360. As the conductive pattern 520 is coupled with the surrounding metal components, degradation of antenna performance due to interference may be mitigated. The conductive pattern 520 may include a first portion 521 coupled with the first camera module 450 and a second portion 522 coupled with the camera bracket 315. The conductive pattern 520 may further include a third portion 523 disposed between the first portion 521 and the second portion 522 to connect the first portion 521 and the second portion 522.

According to various embodiments, a conductive hole 520a may be formed in the second portion 522 of the conductive pattern 520 and a partial area of the supporting member 360 contacting the second portion 522. The conductive hole 520a may pass through the second portion 522 of the conductive pattern 520 and the second supporting member 360 and electrically connect with the circuit board (e.g., the printed circuit board 340 of FIG. 4) of the electronic device. As a ground structure directly connected with the circuit board ground is formed by the conductive hole 520a in addition to the coupling by the conductive pattern 520, the antenna performance may be enhanced.

According to an embodiment, the frequency of the parasitic component may be tuned using a lumped element, such as an inductor or capacitor, on the path electrically connected with the conductive pattern 520 and the circuit board through the conductive hole 520a.

Figure 12:
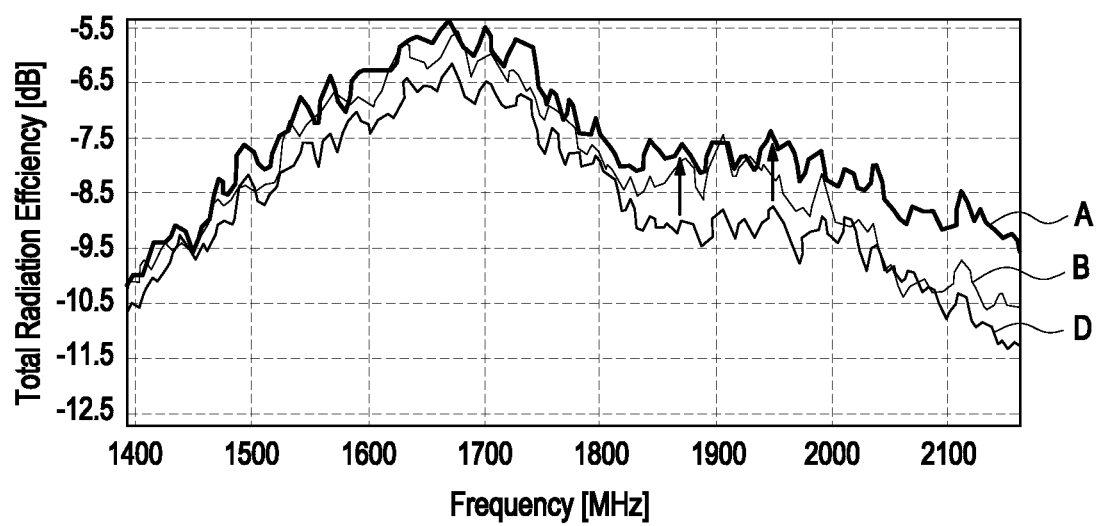
FIG. 12 is a view illustrating a graph related to antenna performance according to various embodiments of the disclosure.

FIG. 12 is a view illustrating a graph related to antenna performance according to various embodiments of the disclosure.

FIG. 12 is a graph illustrating the passive data of an adjacent antenna (e.g., the first conductive portion 511 of FIG. 6) as the first camera module (e.g., the first camera module 450 of FIGS. 5 to 11) and the camera bracket (e.g., the camera bracket 315 of the second camera module 460 of FIGS. 5 to 11) are coupled by the conductive pattern (e.g., the conductive pattern 520 of FIGS. 5 to 11), according to an embodiment of the disclosure.

Referring to FIG. 12, the horizontal axis denotes the frequency band (e.g., frequency), and the vertical axis denotes the total radiation efficiency (TRE). Line D denotes the efficiency of the antenna structure when the conductive pattern is excluded, and lines A and B denote the efficiency of the antenna structure when the conductive pattern is included. Line A and line B may use different bands.

According to an embodiment, in the band of about 1.8 GHz to 2.0 GHZ, it may be identified that line A (or line B) has a total radiation efficiency (TRE) reduced by about 2 dB, e.g., from about 9.5 dB to 7.5 dB, as compared to line D. Accordingly, according to various embodiments of the disclosure, the conductive pattern may couple structures around the camera, removing parasitic components around the antenna and thus enhancing antenna efficiency.

According to various embodiments of the disclosure, an electronic device (e.g., the electronic device 101 of FIGS. 1 to 4) may comprise a housing (e.g., the housing 310 of FIGS. 2 and 3) including a conductive portion, a wireless communication circuit (e.g., the wireless communication module 194 of FIG. 1) electrically connected with the conductive portion, a first camera module (e.g., the first camera module 450 of FIG. 6) disposed in a first area of the housing adjacent to the conductive portion and including a first camera assembly (e.g., the first camera assembly 451 of FIG. 6) and a flexible circuit board (e.g., the flexible circuit board 452 of FIG. 6) extending from the first camera assembly, a second camera module (e.g., the second camera module 460 of FIG. 6) disposed in a second area of the housing, spaced apart from the first camera module, and including a second camera assembly (e.g., the second camera assembly 461 of FIG. 6) and a camera bracket (e.g., the camera bracket 315 of FIG. 6) covering the second assembly and forming at least a partial surface of the housing, and a conductive pattern (e.g., the conductive pattern 520 of FIG. 6) having at least a portion disposed between the first area and the second area and including a first portion (e.g., the first portion 521 of FIG. 8) coupled with the first camera module and a second portion (e.g., the second portion 522 of FIG. 8) coupled with the camera bracket.

According to various embodiments, the conductive pattern may include a laser direct structuring (LDS) pattern. The conductive pattern may be formed on a supporting member (e.g., the supporting member of FIG. 6) positioned in the housing.

According to various embodiments, the conductive pattern may further include a third portion (e.g., the third portion 523 of FIG. 8) disposed between the first portion and the second portion and extending from the first portion to the second portion.

According to various embodiments, when viewed from above one surface of the supporting member, the first portion of the conductive pattern may be disposed to overlap a first edge area (e.g., the first edge area A1 of FIG. 8) of the first camera module, and the second portion of the conductive pattern may be disposed to overlap a second edge area (e.g., the second edge area A2 of FIG. 8) of the camera bracket.

According to various embodiments, the first portion of the conductive pattern may be spaced apart from a first edge area of the first camera module, and the second portion of the conductive pattern may be spaced apart from a second edge area of the camera bracket.

According to various embodiments, a first surface, facing in a first direction, of the first portion of the conductive pattern and a first edge area of the first camera module face each other, and a second surface, facing in a second direction, opposite to the first direction, of the second portion of the conductive pattern and a second edge area of the camera bracket facing each other.

According to various embodiments, as the first camera module and the camera bracket are coupled by the conductive pattern form one dispersible expanded ground.

According to various embodiments, the electronic device may further comprise a ground member formed in one area of the camera bracket and electrically connected with a circuit board of the electronic device.

According to various embodiments, a conductive hole may be formed through the second portion of the conductive pattern and a partial area of the supporting member contacting the second portion. The conductive hole may be electrically connected with a circuit board of the electronic device.

According to various embodiments, the housing (e.g., the housing 310 of FIGS. 2 and 3) may include a rear plate (e.g., the rear plate 311 of FIGS. 2 and 3) including a recess structure formed in an edge area and the camera bracket disposed in the recess structure to be exposed to an outside and electrically connected with the rear plate.

According to various embodiments, the housing may further include a supporting bracket (e.g., the supporting bracket 370 of FIG. 6) including a first sidewall (e.g., the 1-1th sidewall 411 of FIG. 6) connected with the rear plate and a second sidewall (e.g., the 1-2th sidewall 412 of FIG. 6) extending from the first sidewall and connected with the camera bracket.

According to various embodiments, an antenna structure formed on the supporting bracket may include a first conductive portion (e.g., the first conductive portion 511 of FIG. 6) forming at least a portion of the first sidewall, a second conductive portion (e.g., the second conductive portion 514 of FIG. 6) forming at least a portion of the second sidewall, wherein the first conductive portion and the second conductive portion are separated by a sidewall gap (e.g., sidewall gap 513, of FIG. 6).

According to various embodiments, the first camera assembly of the first camera module may be disposed adjacent to the first conductive portion, and the flexible circuit board of the first camera module may be disposed to extend in a direction opposite to the first conductive portion.

According to various embodiments, the camera bracket of the second camera module may be disposed adjacent to the second conductive portion. A plurality of second camera assemblies may be formed side by side. An area, in a first direction, of the camera bracket covering the plurality of second camera assemblies may be larger than an area, in the first direction, of the first camera module.

According to various embodiments, the first camera module may be a front camera facing forward of the electronic device, and the second camera module may be a rear camera facing rearward of the electronic device.

According to various embodiments, the sidewall gap is filled with an elastomeric material, ceramic, mica, glass, plastic, metal oxide, or air.

According to various embodiments, the housing comprises a sidewall, and wherein the sidewall includes the conductive portion and a first sidewall gap between the conductive portion and a remainder of the sidewall and a second sidewall gap between the conductive portion and the remainder of the sidewall.

According to various embodiments, the first conductive portion radiates radio signals in a first frequency band, and the second conductive portion radiates radio signals in a second frequency band.

According to various embodiments of the disclosure, an electronic device (e.g., the electronic device 101 of FIGS. 1 to 4) may comprise a rear plate (e.g., the rear plate 311 of FIGS. 2 and 3) disposed to cover a rear surface of the electronic device and having a recess structure in an edge area, a first camera module (e.g., the first camera module 450 of FIG. 6) exposed through an opening of the rear plate, a camera bracket (e.g., the camera bracket 315 of FIG. 7) of a second camera module (e.g., the second camera module 460 of FIG. 6) disposed along the recess structure and at least a portion of which is exposed to an outside, a supporting bracket (e.g., the supporting bracket 370 of FIG. 6) including a first sidewall (e.g., the first sidewall 411 of FIG.

6) connected with the rear plate and a second sidewall (e.g., the 1-2th sidewall 412 of FIG. 6) extending from the first sidewall and connected with the camera bracket, and a supporting member (e.g., the supporting member 360 of FIG. 6) disposed between the rear plate and the supporting bracket and having at least one conductive pattern (e.g., the conductive pattern 520 of FIG. 6) formed on one surface facing the rear plate. A first conductive member forming at least a portion of the first sidewall and operating as an antenna may be disposed adjacent to the first camera module, and the conductive pattern may include a first portion (e.g., the first portion 521 of FIG. 8) coupled with the first camera module and a second portion (e.g., the second portion 522 of FIG. 8) coupled with the camera bracket.

According to various embodiments, the conductive pattern may further include a third portion disposed between the first portion and the second portion and extending from the first portion to the second portion.

According to various embodiments, a second conductive portion forming at least a portion of the second sidewall and operating as an antenna may be disposed adjacent to the camera bracket and may be spaced apart from the first conductive portion through a sidewall gap.

According to various embodiments, when viewed from above one surface of the supporting member, the first portion of the conductive pattern is disposed to overlap a first edge area of the first camera module, and the second portion of the conductive pattern may be disposed to overlap a second edge area of the camera bracket.

According to various embodiments, the first portion of the conductive pattern may be spaced apart from a first edge area of the first camera module, and the second portion of the conductive pattern may be spaced apart from a second edge area of the camera bracket.

It is apparent to one of ordinary skill in the art that the antenna structure and the electronic device including the same according to various embodiments of the disclosure as described above are not limited to the above-described embodiments and those shown in the drawings, and various changes, modifications, or alterations may be made thereto without departing from the scope of the disclosure.

The invention claimed is:

1. An electronic device, comprising,
a housing including a conductive portion, a supporting bracket, and an antenna structure formed on the supporting bracket having a first conductive portion and a second conductive portion;
a wireless communication circuit electrically connected with the conductive portion;
a first camera module disposed in a first area of the housing proximate to the conductive portion, wherein the first camera module includes a first camera assembly and a flexible circuit board extending from the first camera assembly;
a second camera module disposed in a second area of the housing, spaced apart from the first camera module, wherein the second camera module includes a second camera assembly and a camera bracket covering the second camera module, and wherein the camera bracket forms at least a portion of a surface of the housing; and
a conductive pattern having at least a portion disposed between the first area and the second area and including a first portion coupled with the first camera module and a second portion coupled with the camera bracket,
wherein the camera bracket of the second camera module is disposed adjacent to the second conductive portion, wherein an area of a first surface of the camera bracket which forms at least the portion of the surface of the housing is greater than an area of a second surface of the first camera module which is formed toward the surface of the housing.

2. The electronic device of claim 1,
wherein the conductive pattern includes a laser direct structuring (LDS) pattern, and
wherein the conductive pattern is formed on a supporting member positioned in the housing.

3. The electronic device of claim 2, wherein the conductive pattern further includes a third portion disposed between the first portion and the second portion and extending from the first portion to the second portion.

4. The electronic device of claim 3, wherein when viewed from above one surface of the supporting member, the first portion of the conductive pattern is disposed to overlap a first edge area of the first camera module, and the second portion of the conductive pattern is disposed to overlap a second edge area of the camera bracket.

5. The electronic device of claim 3, wherein the first portion of the conductive pattern is spaced apart from a first edge area of the first camera module, and the second portion of the conductive pattern is spaced apart from a second edge area of the camera bracket.

6. The electronic device of claim 3, wherein a first surface, facing in a first direction, of the first portion of the conductive pattern and a first edge area of the first camera module face each other, and a second surface, facing in a second direction opposite to the first direction, of the second portion of the conductive pattern and a second edge area of the camera bracket facing each other.

7. The electronic device of claim 3, wherein as the first camera module and the camera bracket are coupled by the conductive pattern, a signal path for an antenna forms one dispersible expanded ground.

8. The electronic device of claim 3, further comprising a ground member formed in one area of the camera bracket and electrically connected with a circuit board of the electronic device.

9. The electronic device of claim 3, wherein a conductive hole is formed through the second portion of the conductive pattern and a partial area of the supporting member contacting the second portion, and
wherein the conductive hole is electrically connected with a circuit board of the electronic device.

10. The electronic device of claim 3, wherein the housing includes a rear plate including a recess structure formed in an edge area and the camera bracket disposed in the recess structure to be exposed to an outside and electrically connected with the rear plate.

11. The electronic device of claim 10, wherein the supporting bracket includes a first sidewall connected with the rear plate and a second sidewall extending from the first sidewall and connected with the camera bracket.

12. The electronic device of claim 11, wherein the antenna structure formed on the supporting bracket includes,
the first conductive portion forming at least a portion of the first sidewall,
the second conductive portion forming at least a portion of the second sidewall, and
wherein the first conductive portion and the second conductive portion are separated by a sidewall gap.

13. The electronic device of claim 12, wherein the first camera assembly of the first camera module is disposed adjacent to the first conductive portion, and wherein the flexible circuit board of the first camera module is disposed to extend in a direction opposite to the first conductive portion.

14. The electronic device of claim 12, wherein the sidewall gap is filled with an elastomeric material, ceramic, mica, glass, plastic, metal oxide, or air.

15. The electronic device of claim 3, wherein the first camera module is a front camera facing forward of the electronic device, and the second camera module is a rear camera facing rearward of the electronic device.

16. The electronic device of claim 2, wherein the conductive pattern includes a laser direct structuring (LDS) pattern, and wherein the conductive pattern is formed on a supporting member positioned in the housing.

17. The electronic device of claim 2, wherein the housing comprises a sidewall, and wherein the sidewall includes the conductive portion and a first sidewall gap between the conductive portion and a remainder of the sidewall and a second sidewall gap between the conductive portion and the remainder of the sidewall.

18. The electronic device of claim 2, wherein the conductive portion includes a first conductive portion and a second conductive portion and wherein the housing comprises a sidewall, and wherein the sidewall includes the first conductive portion and a first sidewall gap between the conductive portion and a remainder of the sidewall and a second sidewall gap between the second conductive portion.

19. The electronic device of claim 18, wherein the first conductive portion radiates radio signals in a first frequency band, and the second conductive portion radiates radio signals in a second frequency band.

* * * * *